(12) United States Patent
Bradbury et al.

(10) Patent No.: US 9,898,290 B2
(45) Date of Patent: *Feb. 20, 2018

(54) EFFICIENCY FOR COORDINATED START INTERPRETIVE EXECUTION EXIT FOR A MULTITHREADED PROCESSOR

(71) Applicant: International Business Machines Corporation, Armonk, NY (US)

(72) Inventors: Jonathan D. Bradbury, Poughkeepsie, NY (US); Fadi Y. Busaba, Baltimore, NY (US); Mark S. Farrell, Pleasant Valley, NY (US); Charles W. Gainey, Poughkeepsie, NY (US); Dan F. Greiner, San Jose, CA (US); Lisa C. Heller, Rhineback, NY (US); Jeffrey P. Kubala, Poughquag, NY (US); Damian L. Osisek, Vestal, NY (US); Donald W. Schmidt, Stone Ridge, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/844,223

(22) Filed: Sep. 3, 2015

(65) Prior Publication Data

US 2016/0110218 A1 Apr. 21, 2016

Related U.S. Application Data

(63) Continuation of application No. 14/518,095, filed on Oct. 20, 2014.

(51) Int. Cl.
*G06F 9/30* (2006.01)
*G06F 9/46* (2006.01)
(Continued)

(52) U.S. Cl.
CPC ...... *G06F 9/30065* (2013.01); *G06F 9/30145* (2013.01); *G06F 9/45533* (2013.01);
(Continued)

(58) Field of Classification Search
CPC ........ G06F 9/45533; G06F 9/52; G06F 9/522; G06F 9/30065
See application file for complete search history.

(56) References Cited

U.S. PATENT DOCUMENTS

2008/0288750 A1* 11/2008 Clift .......................... G06F 9/52
712/202
2010/0031254 A1 2/2010 Chin et al.
(Continued)

OTHER PUBLICATIONS

Jason Mars, Multiprocessors and Multithreading, Mar. 3, 2013, 60 pages, [retrieved from the internet on May 13, 2017], retrieved from URL <cseweb.ucsd.edu/classes/wi13/cse141-b/slides/10-Multi-threading.pdf>.*

(Continued)

*Primary Examiner* — Jyoti Mehta
(74) *Attorney, Agent, or Firm* — Cantor Colburn LLP; Steven Chiu (57) ABSTRACT

A system and method of executing a plurality of threads, including a first thread and a set of remaining threads, on a computer processor core. The system and method includes determining that a start interpretive execution exit condition exists; determining that the computer processor core is within a grace period; and entering by the first thread a start interpretive execution exit sync loop without signaling to any of the set of remaining threads. In turn, the first thread remains in the start interpretive execution exit sync loop until the grace period expires or each of the remaining threads enters a corresponding start interpretive execution exit sync loop.

5 Claims, 10 Drawing Sheets

(51) Int. Cl.
*G06F 9/48* (2006.01)
*G06F 9/455* (2006.01)
*G06F 9/52* (2006.01)

(52) U.S. Cl.
CPC ............ *G06F 9/466* (2013.01); *G06F 9/4881* (2013.01); *G06F 9/52* (2013.01); *G06F 9/522* (2013.01)

(56) References Cited

U.S. PATENT DOCUMENTS

| | | |
|---|---|---|
| 2013/0185732 A1 | 7/2013 | Farrell et al. |
| 2013/0185735 A1* | 7/2013 | Farrell .................... G06F 9/542 719/318 |
| 2014/0282564 A1 | 9/2014 | Almog et al. |
| 2016/0110195 A1 | 4/2016 | Bradbury et al. |

OTHER PUBLICATIONS

International Search Report and Written Opinion No. PCT/EP2015/070984 dated Dec. 8, 2015; pp. 13.
List of IBM Patents or Patent Applications Treated as Related; Date Filed: Sep. 3, 2015, pp. 1-2.

* cited by examiner

EFFICIENCY FOR COORDINATED START INTERPRETIVE EXECUTION EXIT FOR A MULTITHREADED PROCESSOR

DOMESTIC PRIORITY

This application is a continuation of U.S. application Ser. No. 14/518,095, filed on Oct. 20, 2014, the disclosure of which is incorporated by reference herein in its entirety.

BACKGROUND

The disclosure relates generally to a coordinated start interpretive execution exit for a multithreaded processor, and more specifically, to a providing a wait state and a warning track in a multithreaded environment in conjunction with the coordinated start interpretive execution exit to reduce resource costs in the multithreaded environment.

In general, multithreading increases a number of processor threads that can operate in parallel within a single processor core. Multithreading provides this increased capacity by having one or more processor threads use portions of hardware of the single processor core that are currently not being used by other processor thread(s) running on that single processor core. For example, during latency caused by a cache-miss or other delay in a first processor thread, one or more other processor threads can utilize core resources dispatched to the first processor thread during the cache-miss, thus increasing a utilization of those core resources.

Although multithreading provides hardware savings, the addition of another thread consumes more coordination costs at a software level than that required to provide an increased capacity using an additional, separate processor core. In many instances, once a certain scaling ratio is achieved, the overhead to coordinate the core resources between threads, whether run on a single or shared processor core, is substantial and can decrease or even outweigh the benefits of an independent processor thread.

SUMMARY

According to one embodiment of the present invention, a method of executing a plurality of threads, including a first thread and a set of remaining threads, on a computer processor core, that comprises determining that a start interpretive execution exit condition exists; determining that the computer processor core is within a grace period; entering by the first thread a start interpretive execution exit sync loop without signaling to any of the set of remaining threads; and remaining by the first thread in the start interpretive execution exit sync loop until the grace period expires or each of the remaining threads enters a corresponding start interpretive execution exit sync loop.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, coordination costs in multithreading between processor threads are substantial and can decrease or even outweigh the benefits of an independent processor thread. Thus, what is needed is a multithreaded environment that provides a wait state and a warning track in conjunction with a coordinated start interpretive execution exit to reduce resource costs in the multithreaded environment.

In general, embodiments of the present invention disclosed herein may include a multithreading system, method, and/or computer program product that utilizes software to efficiently manage infrastructure on a core on a granular thread basis to reduce resource costs of the core. This is accomplished by allowing a hypervisor running on a single thread to dispatch multiple guest threads on a single core using a core-dispatch, along with utilizing wait states and warning tracks in conjunction with a coordinated start interpretive execution exit.

A core dispatch with a coordinated start interpretive execution ("SIE") exit by the multithreading system, method, and/or computer program ("multithreading system") will now be described. That is, via the core dispatch, the multithreading system allows a hypervisor that is running single-threaded to dispatch a multithreaded guest on its core using a single instruction (note that each multithreaded guest represents a guest logical processor or guest thread). An operand of the single instruction can specify either a single state description, which contains a state of all the guest threads, or a group of state descriptions, e.g., each of which represents a state of a single guest thread. Further, to support the use of the core dispatch and in view of the hypervisor running single-threaded, the coordinated SIE exit is provided by the multithreading system to enable all of the guest threads to exit at the same time.

For instance, as each thread of a guest core determines it must exit an interpretive execution mode, it enters a SIE exit state, and waits in an initial SIE exit sync-up loop until all the other valid threads of the same core are also ready to exit. In some instances, each thread signals the other threads to exit before entering this sync-up loop.

A wait state in non-multithreaded and/or multithreaded environments of the multithreading system will now be described. With respect to the non-multithreaded environment, when a guest thread has completed a task from a queue and there are no additional tasks on the queue, the multithreading system will load a wait state code or bit into a program status word ("PSW"). The wait state bit in the PSW causes the guest thread to pause instruction execution until an interruption is presented. When the guest thread is running in a dedicated non-multithreaded environment (e.g., a physical processor is dedicated for use by a single guest thread), and the single guest thread enters the enabled (that is, the guest is enabled for asynchronous interruptions) wait state, the single guest thread will remain dispatched on the physical processor until an interruption is recognized. If a guest thread is running in a shared environment (i.e., the physical processor is being shared between different guest logical processors), when the guest thread enters the wait state, the shared environment will exit interpretive execution with a wait state interception so a hypervisor can, if applicable, dispatch a different guest thread that has work to execute.

With respect to the multithreaded environment, if a guest thread on a core is still executing guest instructions, it is more efficient for the core to continue running until all valid threads on the core have either entered the wait state or a coordinated SIE exit is needed for another reason. Further, the thread that is in the enabled wait state enters a firmware wait state loop; and if an interruption is presented to that thread before all the other threads have entered the wait state, then that thread may handle the interruption and exit the firmware wait state loop (e.g., the interruptions include any request by another thread for a coordinated SIE exit).

Figure 1:
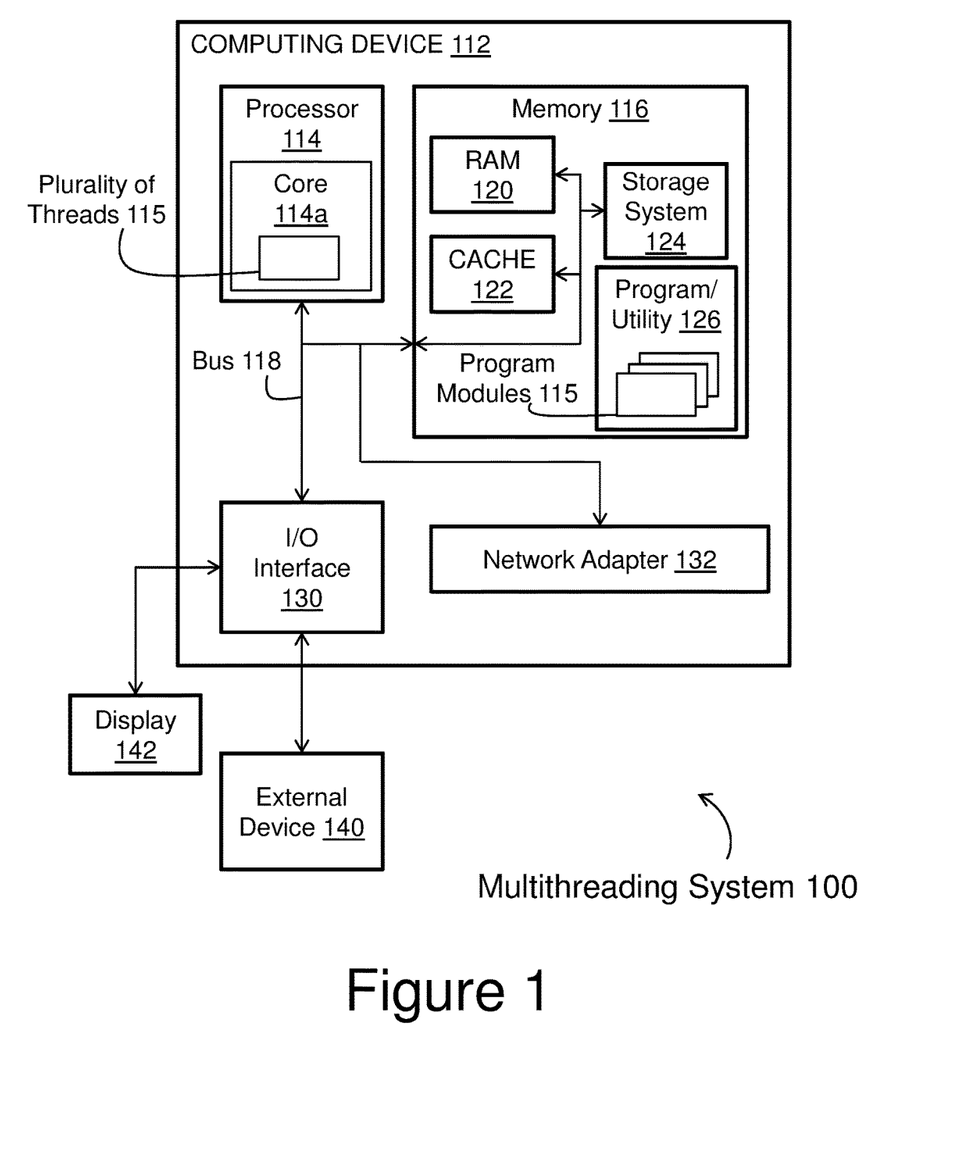
FIG. 1 illustrates a computing device schematic of a multithreading system.

Referring now to FIG. 1, an example of a multithreading system 100 including a computing device 112 is shown. The multithreading system 100 is only one example of a suitable computing node and is not intended to suggest any limitation as to the scope of use or operability of embodiments of the invention described herein (indeed additional or alternative components and/or implementations may be used). That is, the multithreading system 100 and elements therein may take many different forms and include multiple and/or alternate components and facilities. Further, the multithreading system 100 may include and/or employ any number and combination of computing devices and networks utilizing various communication technologies, as described herein. Regardless, the multithreading system 100 is capable of being implemented and/or performing any of the operability set forth herein.

In the multithreading system 100 there is a computing device 112, which is operational with numerous other general purpose or special purpose computing system environments or configurations. Systems and/or computing devices, such as the multithreading system 100 and/or the computing device 112, may employ any of a number of computer operating systems, including, but by no means limited to, versions and/or varieties of the AIX UNIX and z/OS operating systems distributed by International Business Machines Corporation of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems, environments, and/or configurations that may be suitable for use with the computing device 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 112 may be described in the general context of computer system executable instructions, such as program modules, being executed by a computer system. Generally, program modules may include routines, programs, objects, components, logic, data structures, and so on that perform particular tasks or implement particular abstract data types. The computing device 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computing device 112 in the multithreading system 100 is shown in the form of a general-purpose computing device that is improved upon based on the operation and functionality of the multithreading system 100, its methods, and/or elements thereof. The components of the computing device 112 may include, but are not limited to, one or more processors or processing units (e.g., processor 114 that includes at least one core 114a that supports a plurality of threads 115; e.g., a multithreading system 100 includes a core 114a of a processor 114 comprising two or more threads 115), a memory 116, and a bus 118 that couples various system components including the processor 114 and the memory 116. The computing device 112 also typically includes a variety of computer system readable media. Such media may be any available media that are accessible by the computing device 112, and it includes both volatile and non-volatile media, removable and non-removable media.

The processor 114 may receive computer readable program instructions from the memory 116 and execute these instructions, thereby performing one or more processes defined by the multithreading system 100. The processor 114 may include any processing hardware, software, or combination of hardware and software utilized by the computing device 114 that carries out the computer readable program instructions by performing arithmetical, logical, and/or input/output operations. Examples of the processor 114 and core 114a include, but are not limited to an arithmetic logic unit, which performs arithmetic and logical operations; a control unit, which extracts, decodes, and executes instructions from a memory; and an array unit, which utilizes multiple parallel computing elements.

Figure 2:
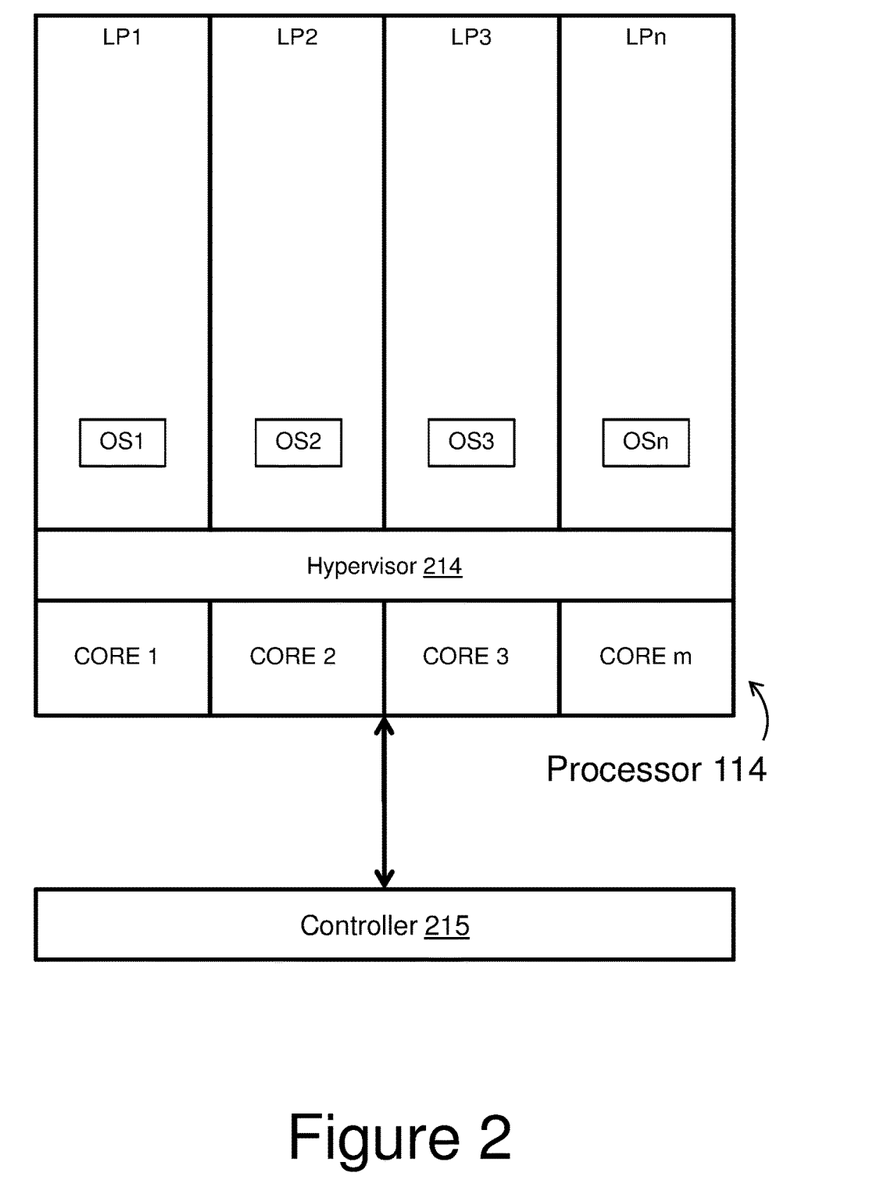
FIG. 2 illustrates a processor schematic of a multithreading system.

FIG. 2 illustrates an embodiment of a computing environment that includes the processor 114 coupled to a controller 215. In one example, a computing environment based on the z/Architecture includes a System z server, offered by International Business Machines Corporation, Armonk, N.Y. The processor 114 can include, for example, one or more partitions (e.g., logical partitions LP1-LPn), one or more physical cores (e.g., Core 1-Core m), and a level-0 hypervisor 214 (e.g., a logical partition manager). The controller 215 can include centralized logic responsible for arbitrating between different processors issuing requests. For instance, when the controller 215 receives a memory access request, it determines if access to that memory location is allowed and, if so, provides the contents of that memory location to the processor 114 while maintaining memory consistency between processors within that complex. Another controller 215 may manage the requests to and from an I/O interface 130 and/or a network adapter 132 shown in FIG. 1.

Physical cores include physical processor resources that are allocated to the logical partitions. A logical partition can include one or more logical processors, each of which represents all or a share of the physical processor resources allocated to the partition. The physical cores may be either dedicated to the logical cores of a particular partition, so that physical processor resources of the underlying core(s) are reserved for that partition; or shared with the logical cores of another partition, so that physical processor resources of the underlying core(s) resources are potentially available to another partition. Each logical partition can be capable of functioning as a separate system. That is, each logical partition can be independently reset, initially loaded with an operating system (e.g., operating system OS1-OSn), if desired, and operate with different programs. An operating system or application program running in a logical partition can appear to have access to a full and complete system, but in reality, only a portion of the entire system is available. A combination of hardware and Licensed Internal Code (also referred to as firmware, microcode, or millicode) keeps a program in one logical partition from observing, accessing, or interfering with a program in a different logical partition. This allows several different logical partitions to operate on a single or multiple physical cores in a time sliced manner. In an embodiment, each physical core includes one or more central processors (also referred to herein as "physical threads"). In the example shown in FIG. 2, each logical partition has a resident operating system, which may differ for one or more logical partitions. Each logical partition is an example of a virtual machine or guest configuration, in which an operating system is capable of running.

In the embodiment shown in FIG. 2, the logical partitions LP1-LPn are managed by level-0 hypervisor 214 which is implemented by firmware running on physical cores Core1-Core m. Logical partitions LP1-LPn and hypervisor 214 each comprise one or more programs residing in respective portions of central storage (memory) associated with the physical cores Core1-Core m. One example of hypervisor 214 is the Processor Resource/Systems Manager (PR/SM™), offered by International Business Machines Corporation, Armonk, N.Y.

Returning to FIG. 1, the memory 116 may include a tangible device that retains and stores computer readable program instructions, as provided by the multithreading system 100, for use by the processor 114 of the computing device 112. The memory 116 can include computer system readable media in the form of volatile memory, such as random access memory (RAM) 120, cache memory 122, and/or the storage system 124. The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

By way of example only, the storage system 124 can be provided for reading from and writing to non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the memory 116 may include at least one program product having a set (e.g., at least one) of program modules that are configured to carry out the operations of embodiments of the invention. The storage system 124 (and/or memory 116) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 124 may generally be included within the computing device 112, as illustrated, employing a computer operating system such as one of those mentioned above, and is accessed via a network in any one or more of a variety of manners.

A program/utility 126, having a set (at least one) of program modules 128, may be stored in memory 116 by way of example, and not limitation, as well as an operating system, one or more application programs, other program modules, and program data. Each of the operating system, one or more application programs, other program modules, and program data or some combination thereof, may include an implementation of a networking environment.

The computing device 112 may also communicate via an input/output (I/O) interface 130 and/or via a network adapter 132. The I/O interface 130 and/or the network adapter 132 may include a physical and/or virtual mechanism utilized by the computing device 112 to communicate between elements internal and/or external to the computing device 112. For example, the I/O interface 130 may communicate with one or more external devices 140, such as a keyboard, a pointing device, a display 142, etc.; one or more devices that enable a user to interact with the computing device 112; and/or any devices (e.g., network card, modem, etc.) that enable the computing device 112 to communicate with one or more other computing devices. Further, the computing device 112 can communicate with one or more networks such as a local area network (LAN), a general wide area network (WAN), and/or a public network (e.g., the Internet) via network adapter 132. Thus, I/O interface 130 and/or the network adapter 132 may be configured to receive or send signals or data within or for the computing device 112. As depicted, the I/O interfaces 130 and the network adapter 132 communicate with the other components of the computing device 112 via the bus 118. It should be understood that although not shown, other hardware and/or software components could be used in conjunction with the computing device 112. Examples, include, but are not limited to: microcode, device drivers, redundant processing units, external disk drive arrays, RAID systems, tape drives, and data archival storage systems, etc.

While single items are illustrated for the multithreading system 100 (and other items) by FIG. 1, these representations are not intended to be limiting and thus, any items may represent a plurality of items. For example, the processor 114 may include a plurality of processing cores, each of which executes a plurality of threads and is capable of processing a coordinated SIE exit described herein.

Figure 3A:
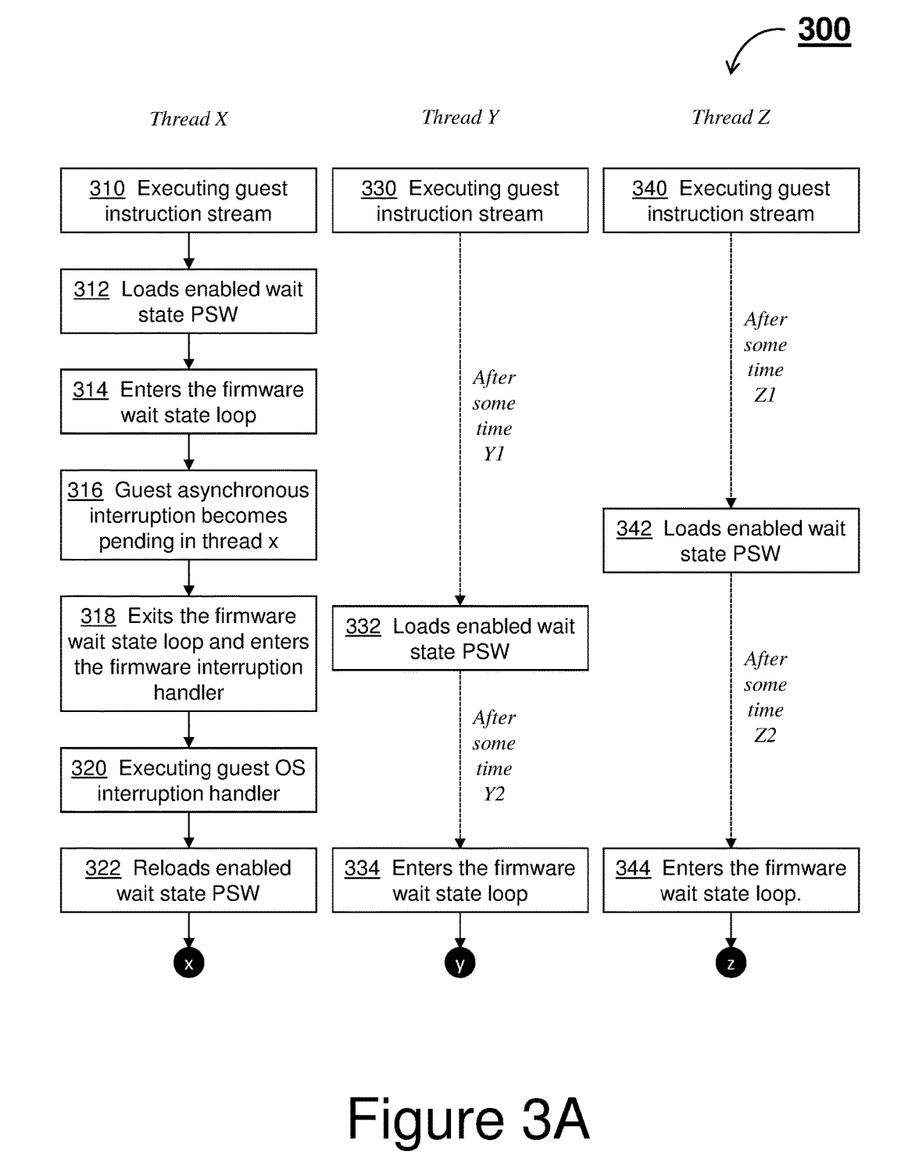
FIGS. 3A-3B illustrate a process flow of a multithreading system with respect to a wait state.
Figure 3B:
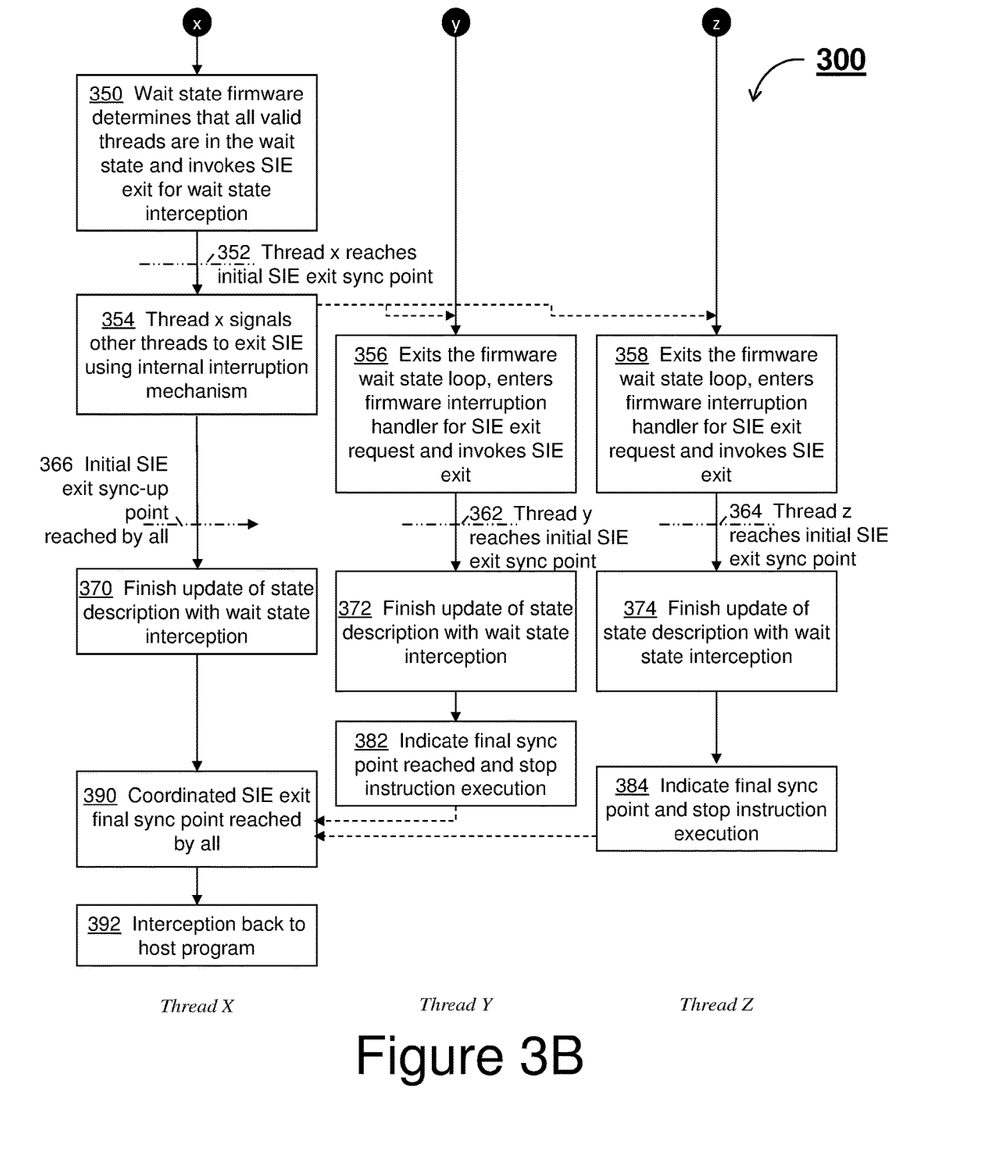

The multithreading system will be described with reference to FIGS. 3A-3B, which illustrate one example of a process flow 300 with respect to a wait state and coordinated SIE exit.

As illustrated, the process flow 300 is executed by a plurality of threads, e.g., Thread X, Thread Y, and Thread Z. At blocks 310, 312, and 314, Thread X (e.g., a primary thread) executes guest instructions, loads an enabled wait state PSW, and enters a firmware wait state loop. Thread X does not exit SIE at this time since both Thread Y and Thread Z (e.g., secondary threads) are still executing guest instruction streams (e.g., blocks 330, 340). Thread X remains in the firmware wait state loop until a guest asynchronous interruption becomes pending, at block 316. At block 318, the guest asynchronous interruption causes Thread X to exit the wait state loop and enter a firmware asynchronous interruption handler. The firmware asynchronous interruption handler saves an interruption old PSW and interruption information into fixed storage locations in the first block of guest memory, loads a guest interruption new PSW into the hardware. Next, at block 320, Thread X begins executing a guest software interruption handler. When Thread X completes executing the software interruption handler, the guest operating system reloads the enabled wait PSW at block 322, which again invokes/enters the firmware wait state loop.

Meanwhile, Thread Y independently, executes guest instructions at block 330, loads an enabled wait state PSW at block 332, and enters a firmware wait state loop at block 334. Similarly, Thread Z independently, executes guest instructions at block 340, loads an enabled wait state PSW at block 342, and enters a firmware wait state loop at block 344. That is, each Thread Y, Z loads a corresponding enabled wait state PSW (blocks 332, 334) after some respective time Y1, Z1, such that these events happen independently. Further, each Thread Y, Z enters a corresponding firmware wait state PSW (blocks 334, 344) after some respective time Y2, Z2, such that these events happen independently. At block 350, Thread X determines that all valid threads (e.g., Threads X, Y, Z) of the core are now in the wait state and invokes SIE exit for wait state interception. Next, at line 352, Thread X reaches an initial SIE exit sync-up point that causes Thread X to signal Threads Y, Z to exit SIE using internal interruption mechanism, as shown in block 354. The process of detecting that all threads are in the wait state and signaling the other threads to exit SIE can be performed by any of the thread and is typically done by the last thread which enters the wait state.

Having received the internal interruption signal from block 354, Threads Y and Z independently exit. That is, Threads Y and Z independently, exit their firmware wait state loops for the SIE exit request, handle the internal interruption, and call SIE exit (as indicated in blocks 356 & 358). Eventually the Threads Y and Z reach the initial SIE exit sync-up loop, at lines 362,364). Once all valid threads (e.g., Threads X, Y, Z) have reached the initial sync-up point (line 366), each thread independently completes the update of their state description and indicates a wait state interception (e.g., block 370, 372, 374). Once each thread (e.g., Threads Y, Z) has completed updating its state description, that thread sets hardware control bits. Particularly, at block 382, Thread Y sets the hardware control bits to indicate that the final SIE exit sync-up point has been reached and to stop instruction execution. Similarly, at block 384, Thread Z sets the hardware control bits to indicate that the final SIE exit sync-up point has been reached and to stop instruction execution. Next, at block 390, Thread X (e.g., the primary thread) waits for all Threads Y, Z to reach the final sync-up point, which means all threads have completed all state description updates, and completes the coordinated SIE exit. Lastly, at block 392, Thread X then presents a multithreaded SIE interception to the host, which handles the multi-threaded SIE interception.

Figure 4A:
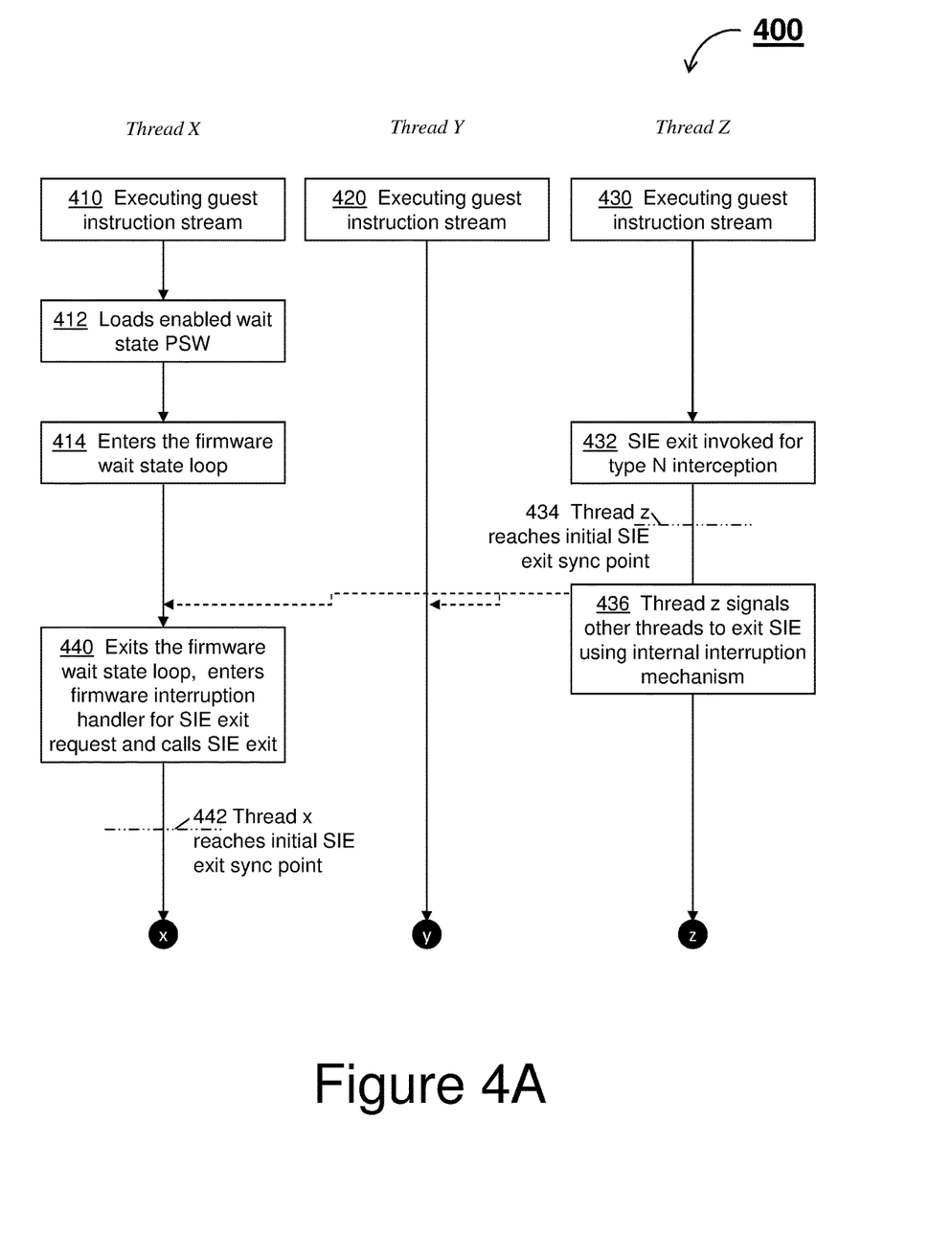
FIGS. 4A-4B illustrate another process flow of a multithreading system with respect to a wait state in a core dispatch environment.
Figure 4B:
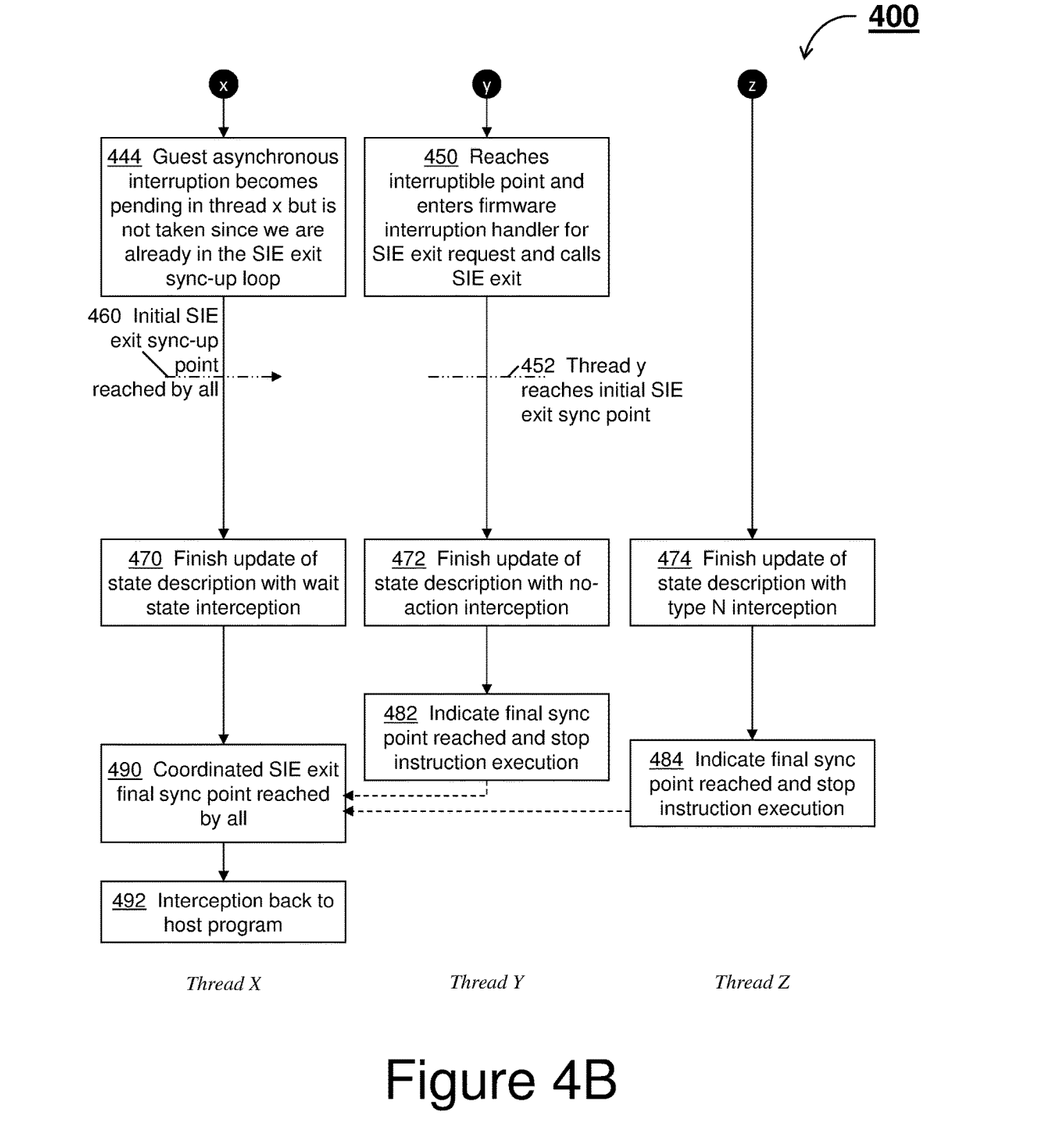

As another example of the multithreading system with respect to a wait state and coordinated SIE exit, a process flow 400 will be described with reference to FIG. 4A-B. Similar to the process flow 300, the process flow 400 is executed by a plurality of threads, e.g., Thread X, Thread Y, and Thread Z. To start the process flow 400, Thread X executes guest instructions, loads an enabled wait state PSW, and enters a firmware wait state loop, at blocks 410, 412, and 414. Similarly, in blocks 420 and 430, Thread Y and Thread Z are also executing guest instructions, which cause Thread X to remain in the wait-state loop rather than invoking SIE Exit.

Further, at block 432, while Thread X is still in the firmware wait state loop, Thread Z executes something that causes a SIE exit to be invoked for a type N interception. At line 434, Thread Z reaches the initial SIE exit sync point that, in turn, signals the other threads to exit SIE using corresponding internal interruption mechanisms (e.g., block 436). In response, Thread X exits the firmware wait state loop for a SIE exit request, enters firmware interruption handler for SIE exit, and calls SIE exit at block 440. Therefore, Thread X reaches an initial SIE exit sync point at line 442. Next, at block 444, a guest asynchronous interruption becomes pending on Thread X, but it is not presented since this thread is already in SIE exit. When Thread Y reaches an interruptible point it takes an internal interruption for the SIE exit request and calls an SIE exit at block 450. Thread Y then reaches the initial SIE exit sync-up loop at line 452.

Once all valid threads (e.g., Threads X, Y, Z) have reached the initial sync-up point (e.g., line 460), each thread independently completes the update of their state description and indicates the applicable interception (e.g., block 470, 472, 474). For example, Thread X takes a wait state interception since the PSW bit 14 is equal to one at block 470; Thread Y takes a no-action interception at block 472), and Thread Z takes the original type N interception at block 474. As is described for the process flow 300 above, once each Thread Y and Z, in this example, has completed all its state description updates, it has reached the final SIE exit sync-up point and stops its own instruction execution (472,474). For instance, at blocks 482, 484, Threads Y and Z set the hardware control bits to indicate that the final SIE exit sync-up point has been reached and to stop instruction execution. Next, at block 490, Thread X waits for all threads to reach the final sync-up point, which means all threads have completed all state description updates, and completes the coordinated SIE exit. Lastly, at block 492, Thread X then presents a multithreaded SIE interception to the host, which handles the multithreaded SIE interception.

For example, a non-multithreading guest operating system may be signaled via a warning track interruption that its time slice is about to expire. The hypervisor uses the host CPU timer to determine when one guest processor core's time slice has expired so that another guest core can begin its time slice. In addition, the hypervisor can remotely, from another processor by setting a bit in a target state description, indicate that the warning track interruption should be presented to the guest logical core. When the machine detects that a host timer interruption is pending while the grace period is not active, or the machine detects that the warning track interruption is pending in the state description, it enters the grace period. The grace period is implemented by adding minimal additional time to the time slice and, when enabled, signals the guest operation system via the warning track interruption that its time slice is about to expire. This additional time allows a warning track interruption-cognizant guest to take appropriate action (often called "cleanup") before being taken off the processor; such action may, for example, include the releasing of system-level locks. Once the guest has completed its clean-up it is expected to signal the completion thereof by issuing the diagnostic acknowledgement (e.g., the guest executes a DIAGNOSE instruction with code '049C' indicating warning-track acknowledgement). If the DIAG '049C' warning track interruption acknowledgement is issued before the grace period expires, then the system intercepts back to the hypervisor with an instruction interception, and the hypervisor handles it as the end of a time slice. If, instead, the grace period expires before the guest operating system has issued the DIAG '049C' warning track interruption acknowledgement, then a host timer interruption is presented, and the hypervisor handles the time-slice end.

Warning track interruption ("WTI") handling executed in the multithreading system will now be described. When multithreading is active in a guest, a hypervisor manages the guest time slice on a core basis. There is a single host timer, and its associated interruption indicates when the guest time slice has ended for all threads in the core. Further, when the hypervisor makes a WTI pending in a primary state description, it is the responsibility of the multithreading system to make that WTI interruption pending in the secondary state descriptions. When the host timer interruption occurs, or when a pending WTI is detected in the primary state description, the core enters a grace period. The resulting WTI interruptions are held pending and, when enabled, presented separately on each valid guest thread. As described above, when appropriate, a guest that loads an enabled wait enters the firmware wait state loop. If, however, the grace period is active or a WTI is pending when the enabled wait state is loaded, then the guest will enter the SIE exit sync-up loop instead. A difference between the two loops is that the wait state loop will handle pending interruptions, which might prolong the time required to complete SIE exit and would be in direct opposition to the result desired in response to the WTI.

Figure 5:
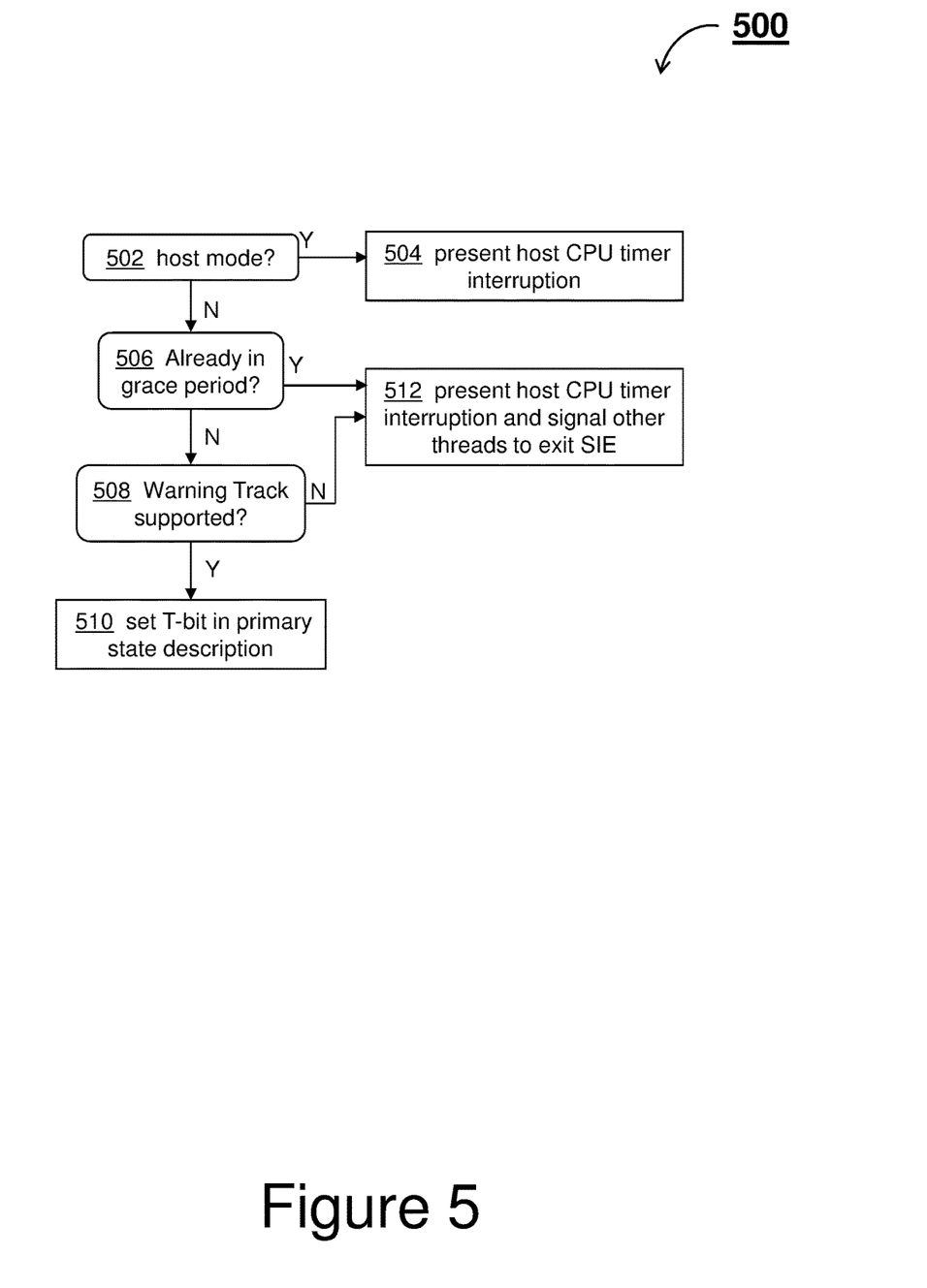
FIG. 5 illustrates a process flow of a multithreading system with respect to a warning track in a core dispatch environment.

The multithreading system will be described with reference to FIG. 5, which illustrates one example of a process flow 500 with respect to WTI and a core dispatch. As illustrated, the process flow 500 describes the handling of host processor timer ("CPT") interruptions from the perspective of warning track. If a CPT becomes pending and the host is enabled to take that interruption, firmware is invoked to handle that interruption. That is, the process flow 500 at decision block 502 checks as to whether the processor core is running in host mode. If the core is running in host mode, the process flow 500 proceeds to block 504 where a host CPT interruption is presented (e.g., as indicated by the 'Y' arrow). If the core not running in host mode (e.g., as indicated by the 'N' arrow), then it is running in guest mode and the process flow 500 proceeds to decision block 506.

At decision block 506, the process flow 500 checks as to whether a grace period is active. When the grace period is not already in progress, the process flow 500 proceeds (e.g., as indicated by the 'N' arrow) to determine whether the warning track is supported for this guest at decision block 508. When the warning track is supported, the process flow 500 proceeds to block 510 (e.g., as indicated by the 'Y' arrow) to set a T-bit, which resides in a state description and indicates that a warning track request is pending, in the primary state description for this core. Otherwise, if the grace period is not in progress and/or the warning track is not supported, the process flow 500 proceeds to block 512. In block 512, SIE exit is invoked so the host CPT interruption can be presented to the host and, in guest multithreaded mode, the other threads are signaled to exit SIE. This behavior is the same as the WTI behavior in a non-MT environment except that, in an MT environment, other threads are signaled to exit SIE when a host CPT interruption is to be presented.

A WTI in conjunction with a coordinated SIE exit of the multithreading system will now be described. For implementations that signal the other threads to exit SIE when taking a guest interception, such signaling should not be performed when a WTI is pending or the core is in the grace period. Instead, the multithreading system will give the other threads the opportunity to complete their cleanup and issue the diagnostic acknowledgement (e.g., the guest executes a DIAGNOSE instruction with code '049C' indicating warning-track acknowledgement) before the SIE exit occurs. If the grace period expires before all the valid threads have synced-up, then the remaining threads will be signaled to exit.

IN a multi-threading environment, any exiting processor will remain in the SIE exit sync-up loop until all other valid processor are either 1) entering the wait state during the grace period, 2) are in the wait state when the core enters the grace period, 3) exiting SIE for an independent reason including for an instruction interception after issuing a DIAG 049C to indicate that cleanup was completed, or 4) exiting SIE in response to signaling from another thread. The typical and desired situation is that all the threads will, independently, complete cleanup and issue the DIAG 049C WTI acknowledgement before the grace period expires or will be in the wait state when entering the grace period on that core. The MT-specific behavior for warning track is the delay of SIE exit signaling during the grace period in an effort to allow the operating system on each thread to cleanup before being removed from the processor.

Figure 6A:
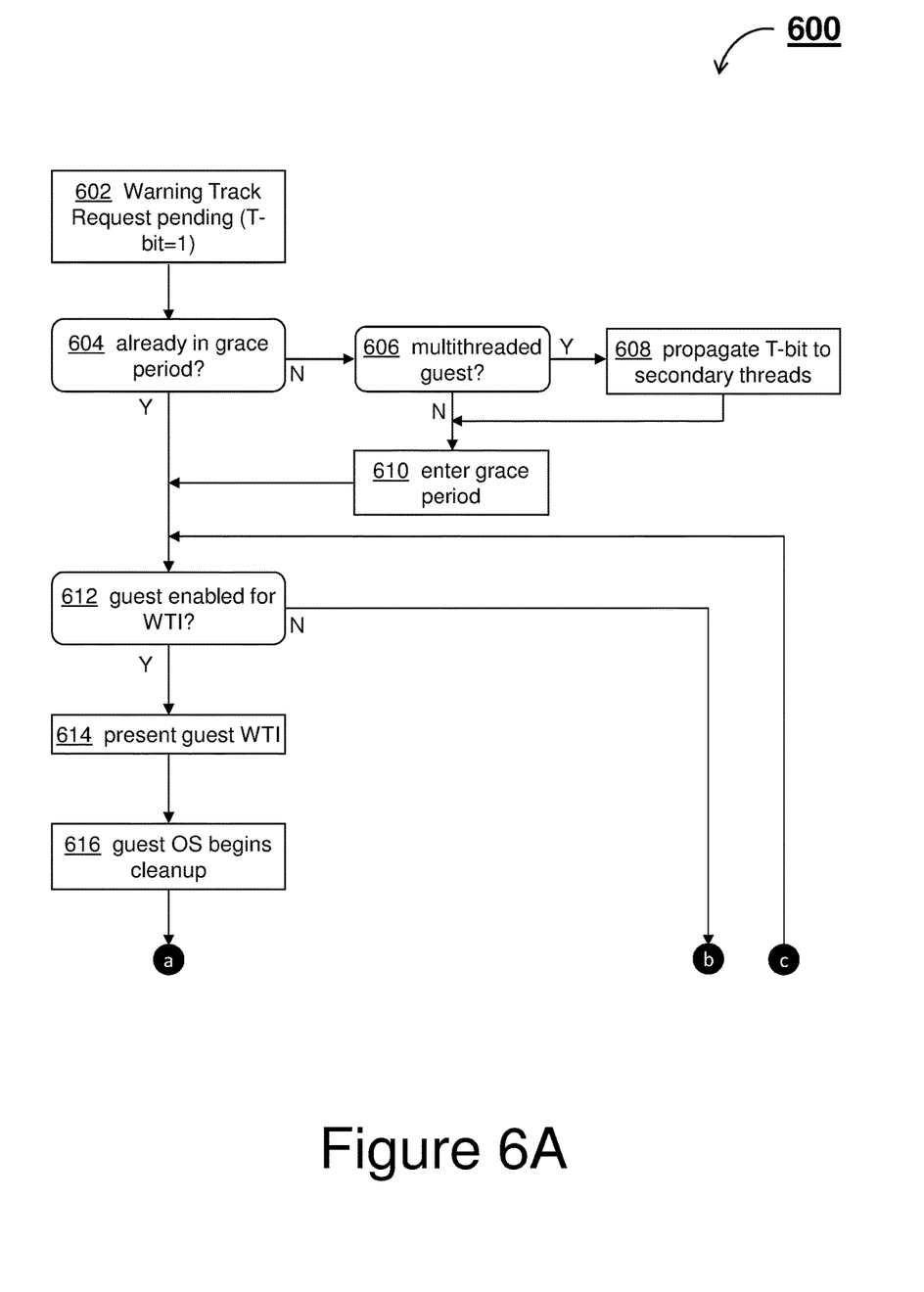
FIGS. 6A-6C illustrate another process flow of a multithreading system with respect to a warning track in a core dispatch environment.

The multithreading system will be described with reference to FIGS. 6A-6C, which illustrate one example of a process flow 600 with respect to a warning track in a core dispatch environment. In general, the process flow 600 illustrates a behavior on any given thread once a warning track request is pending. Thus, the process flow 600 starts at block 602 when a T-bit is on for any thread (e.g., a primary or secondary thread). The T-bit in the primary state description may be set by the multithreading system when handling a host timer interruption, as shown in FIG. 5, or by the hypervisor. Once the T-bit is detected by the multithreading system, the multithreading system determines whether the core is in the grace period at decision block 604. If the core is not in the grace period (e.g., as indicated by the 'N' arrow), the multithreading system determines whether the core is running in a guest multithreaded environment at decision block 606. When the core is running in a guest multithreaded environment, the process flow 600 proceeds to block 608 where the multithreading system sets the T-bit in the secondary state descriptions for all valid secondary threads in the state description group. Note the propagation of the T bit to the state descriptions of secondary threads only if this process flow is executing on the primary thread. Further, regardless of whether the core is running in a guest multithreaded environment, the process 600 proceeds to block 610 where the core enters the grace period (e.g., providing the that the T-bit is on as seen in block 602 and the grace hasn't been entered as seen in block 604. Entering the grace period includes extending the guest time slice by a short amount and setting an indication that the grace period is active. The grace period also begins even if the WTI cannot be presented to any or all of the threads. Next, at decision block 612, the multithreading system determines if the guest thread is enabled for a WTI. When the multithreading system determines that the guest thread is enabled for the WTI, then the interruption is presented at block 614 and the guest operating system may take appropriate action such as beginning cleanup at 616 (the process flow 600 then proceeds to decision block 618 of FIG. 6B via the flow connector 'a'). When the multithreading system determines that the guest is not enabled for the WTI, then the WTI cannot be presented and the guest execution continues until it does become enabled or until another condition for SIE exit occurs (the process flow 600 then proceeds to decision block 642 of FIG. 6C via the flow connector 'b').

Figure 6B:
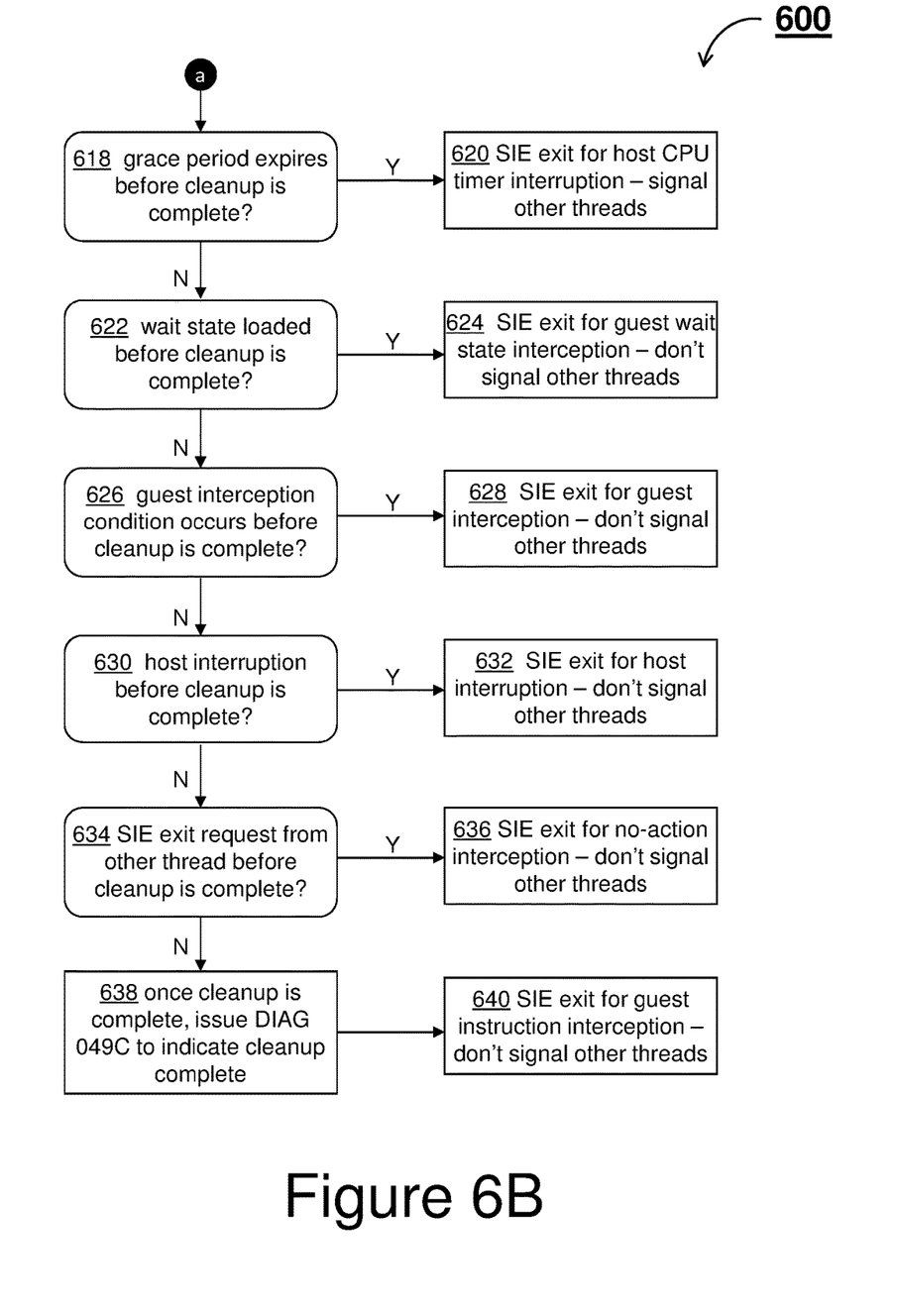

As illustrated in FIG. 6B, once a WTI interruption has been presented to the guest, the multi-threading system monitors for certain conditions while completing cleanup. The process flow 600 proceeds to decision block 618 where the multithreading system determines whether the grace period has ended before cleanup is complete. If the grace period has ended (e.g., as indicated by the 'Y' arrow), the process flow 600 proceeds to block 620 where an SIE exit is invoked and the other threads are signaled to exit. Note that if SIE exit is invoked during the grace period for any other reason, the other threads are not signaled in order to give them time to finish their cleanup. If the grace period has not ended (e.g., as indicated by the 'N' arrow), the process flow 600 proceeds to decision block 622 where the multithreading system determines if a wait state PSW is loaded before cleanup is complete. When the wait state PSW is loaded (e.g., as indicated by the 'Y' arrow), the process flow 600 proceeds to block 624 where a wait state interception is presented on this thread. If a wait state PSW is not loaded (e.g., as indicated by the 'N' arrow), the process flow 600 proceeds to decision block 626 where the multithreading system determines if a guest interception occurs before cleanup is complete. If the guest interception occurs (e.g., as indicated by the 'Y' arrow), the process flow 600 proceeds to block 628 where that interception is taken on this thread. If no guest interception occurs (e.g., as indicated by the 'N' arrow), the process flow 600 proceeds to decision block 630 where the multithreading system determines if a host interruption occurs before cleanup is complete. If the host interruption occurs (e.g., as indicated by the 'Y' arrow), the process flow 600 proceeds to block 632 where SIE exit is invoked so the interruption can be presented. If no host interruption occurs (e.g., as indicated by the 'N' arrow), the process flow 600 proceeds to decision block 634 where the multithreading system determines if a SIE exit request from another thread is received before cleanup is complete. If the SIE exit request is received from another thread (e.g., as indicated by the 'Y' arrow), the process flow 600 proceeds to block 636 where a no-action interception occurs on this thread. If a SIE exit request is not received from another thread (e.g., as indicated by the 'N' arrow), the process flow 600 proceeds to block 638 where an DIAG '049C' WTI acknowledgement is issued if the guest operating system is able to complete cleanup and before any of the other conditions occur. Next, at block 640, an instruction interception for the DIAG occurs. Once all the threads have reached the SIE exit final sync loop, then the guest interception(s) and/or host interruption is presented to the host on the primary thread.

Figure 6C:
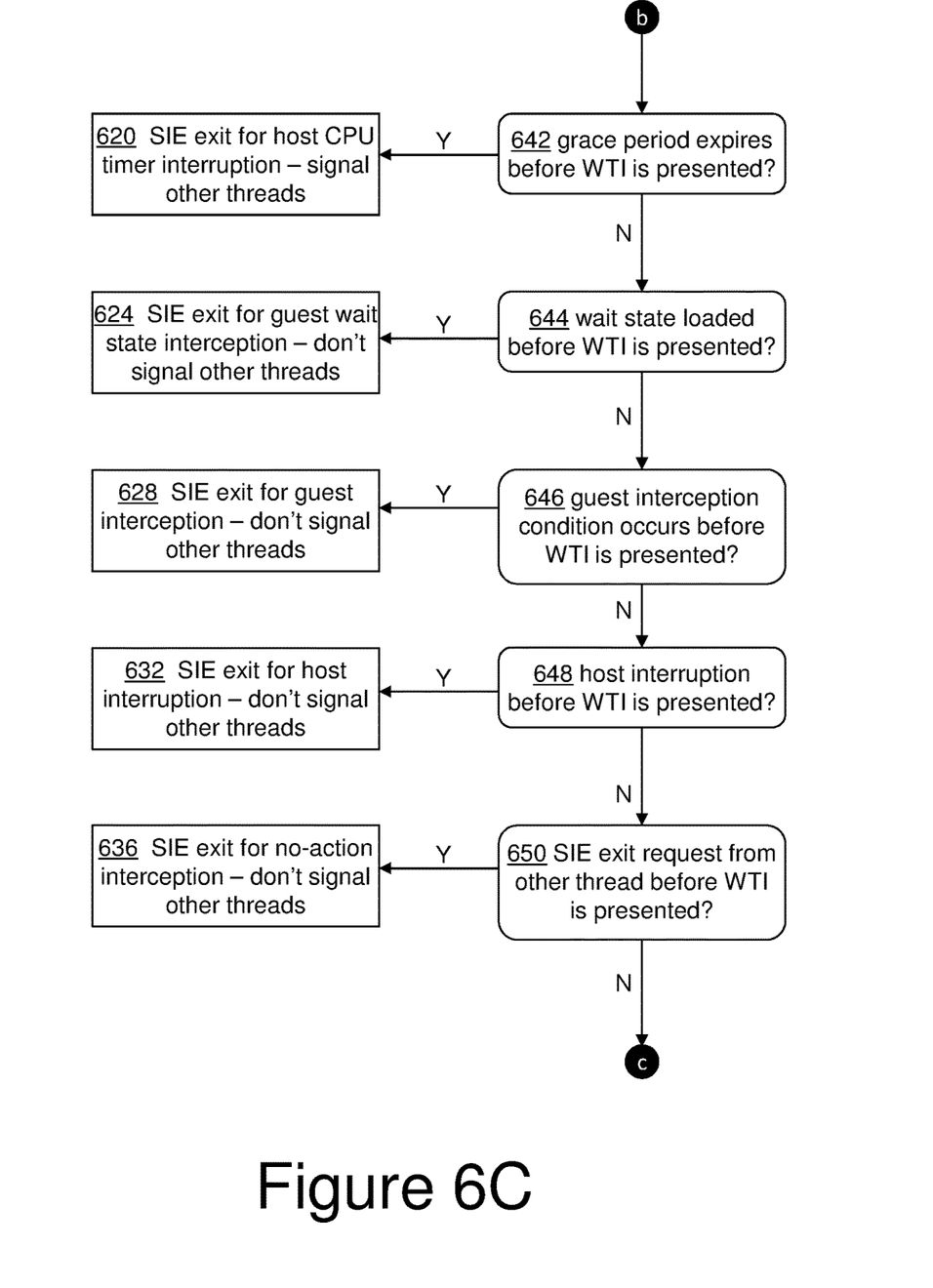

As illustrated in FIG. 6C, if the WTI interruption is not enabled the guest thread continues to monitor for the enablement of WTI interruptions, so that cleanup will occur, and monitors for other conditions including the end of the grace period. The process flow 600 proceeds to decision block 642 where the multithreading system determines whether the grace period has ended before the WTI becomes enabled and the interruption is presented to software. If the grace period has ended (e.g., as indicated by the 'Y' arrow), the process flow 600 proceeds to block 620 where an SIE exit is invoked and the other threads are signaled to exit. Again note that if SIE exit is invoked during the grace period for any other reason, the other threads are not signaled in order to give them time to finish their cleanup. If the grace period has not ended (e.g., as indicated by the 'N' arrow), the process flow 600 proceeds to decision block 644 where the multithreading system determines if a wait state PSW is loaded before the WTI is presented. If a wait state PSW is loaded (e.g., as indicated by the 'Y' arrow), the process flow 600 proceeds to block 624 where a wait state interception is presented on this thread. If a wait state PSW is not loaded (e.g., as indicated by the 'N' arrow), the process flow 600 proceeds to decision block 646 where the multithreading system determines if a guest interception is required by this thread. If a guest interception occurs (e.g., as indicated by the 'Y' arrow), the process flow 600 proceeds to block 628 where that interception is taken on this thread. If a guest interception does not occur (e.g., as indicated by the 'N' arrow), the process flow 600 proceeds to decision block 648 where the multithreading system determines if a host interruption before the WTI is presented. If the host interruption occurs (e.g., as indicated by the 'Y' arrow), the process flow 600 proceeds to block 632 where SIE exit is invoked so the interruption can be presented. If no host interception (e.g., as indicated by the 'N' arrow), the process flow 600 proceeds to decision block 650 where the multithreading system determines if a SIE exit request from another thread is received. If a SIE exit request is received from another thread (e.g., as indicated by the 'Y' arrow), the process flow 600 proceeds to block 636 where a no-action interception occurs. If a SIE exit request is not received from another thread (e.g., as indicated by the 'N' arrow), the process flow 600 proceeds to decision block 612 of FIG. 6A (via the flow connector 'c') where the multithreading system determines if the guest is enabled for a WTI.

The WTI in a multithreading environment can also be expanded to encompass additional signaling to the operating system before SIE exit sync-up signaling is performed. In cases where the expected hypervisor response to the interruption or interception which caused the SIE exit would be to dispatch another, different, guest core, it would usually be beneficial to use WTI to warn the threads that are still executing that they are about to be removed from the processor In general, computing devices may include a processor (e.g., a processor 114 of FIG. 1) and a computer readable storage medium (e.g., a memory 116 of FIG. 1), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the multithreading system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of multithreading system and method. The multithreading system and method and/or elements thereof, as implemented and/or claims, improves the functioning of a computer and/or processor itself because the utilized wait states and warning tracks in conjunction with a coordinated start interpretive execution exit reduce resource costs. Further, the multithreading system, method, and/or computer program product provides a more efficient means of providing wait state and warning track support in a multithreaded environment. For instance, a modified wait state of a first thread running in a shared environment delays the start interpretive execution exit until all threads of the shared environment are in the modified wait state. A warning track, during a grace period, delays signaling between threads to begin a coordinated start interpretive execution exit to give each of the threads time to "clean-up" before they exit.

In other words, the improvements include providing mechanisms to have a core remain dispatched until all threads on that core have entered the wait state in a shared physical processor environment; to recognize that the threads in the core are in the process of "cleaning-up" and delay the signaling of other threads for "immediate" SIE exit to give them the opportunity to finish cleaning-up before they are forced to exit; and to exploit the use of the warning track interruption facility to exit SIE more effectively in a multi-threaded environment.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of executing a plurality of threads on a computer processor core, wherein the plurality of threads comprises a first thread and a remaining threads, the method comprising:
    determining that a start interpretive execution exit condition exists;
    determining that the computer processor core is within a grace period;
    entering, by the first thread, a start interpretive execution exit sync loop without signaling to any of the remaining threads;
    remaining, by the first thread, in the start interpretive execution exit sync loop until the grace period expires or each of the remaining threads enters a corresponding start interpretive execution exit sync loop,
    determining that the grace period has expired for the computer processor core; and
    signaling, by the first thread, each of the remaining threads to proceed to the corresponding start interpretive execution exit sync loop based on expiration of the grace period.

2. The method of claim 1, further comprising:
    determining that the first thread is pending for a warning track interruption;
    propagating warning track interruption pending condition by the first thread to each of the remaining threads; and
    causing, by the first thread, the computer processor core to enter the grace period.

3. The method of claim 1, further comprising:
    determining that a wait state is pending for the first thread;
    determining that a warning track interruption pending condition exists for the first thread; and
    entering the start interpretive execution exit sync loop based on the determining that the warning track interruption pending condition exists.

4. The method of claim 3, wherein the start interpretive execution exit sync loop is entered based on the determining that the warning track interruption pending condition exists without presenting a warning track interruption and without signaling each of the remaining threads.

5. The method of claim 1, wherein the first thread is a primary thread of the plurality of threads.

* * * * *